United States Patent
Perminov

[15] 3,699,844
[45] Oct. 24, 1972

[54] DIVIDING ATTACHMENT

[72] Inventor: Evgeny Mikhailovich Perminov, Minsk, U.S.S.R.

[73] Assignee: Minsky opytny zavod Spetsialnogo Konstruktoskogo Bjuro No. 3, Minsk, U.S.S.R.

[22] Filed: Aug. 14, 1970

[21] Appl. No.: 63,783

[30] Foreign Application Priority Data

Aug. 14, 1969 U.S.S.R. ...................1361761
Aug. 14, 1969 U.S.S.R. ...................1361763
Aug. 14, 1969 U.S.S.R. ...................1361764

[52] U.S. Cl..................90/57, 74/813 L, 33/174 TD
[51] Int. Cl. .............................................B23q 17/04
[58] Field of Search ........90/57; 33/174 TB, 174 TD; 74/826, 813 L

[56] References Cited
UNITED STATES PATENTS 2,527,871 10/1950 Bakewell...................74/813 L

*Primary Examiner*—Francis S. Husar
*Attorney*—Holman & Stern

[57] ABSTRACT

Dividing attachments for angular indexing in which the attachment is provided with two coaxial plates, in one of which spherical indentations extend along a circumference, while in the other balls are fixed for entering the indentations of the first plate. The indentations are made by compacting the material of the plate to a depth which is less, than their radius, and the balls are pressed into the plate to a depth which exceeds their radius, and are embedded in the plate.

The attachment is intended to be employed mainly in metal-working machines and in jigs used therewith.

2 Claims, 6 Drawing Figures

PATENTED OCT 24 1972 3,699,844

INVENTOR
Evgeny Mikhailovich Perminov
By Holman + Stern
ATTORNEYS

DIVIDING ATTACHMENT

BACKGROUND OF THE INVENTION

The present invention relates to devices designed for angular indexing, and more particularly to a dividing attachment for angular indexing, in which the mutual angular position of the turning parts is fixed by means of balls.

The present dividing attachment can most successfully be employed in various types of universal assembly jigs, in swivelling stands of milling and drilling machines, in spline-grinding machines, to set the arbor at a definite angle, as well as in all indexing devices in which the component must be rigidly fixed at a specified angle, say, with respect to the tool.

The conventional dividing attachments for angular indexing, comprise at least two flat plates whose mutual angular position is fixed by means of balls. On the plane side of one of these plates, i.e. the index plate, there are provided spherical recesses uniformly disposed along one circumference. On the other plate, i.e. the locking plate, balls are fixed which enter the recesses of the index plate.

One of the disadvantages of the conventional dividing attachments is that they do not secure a high accuracy of angular indexing, which is due to production difficulties occurring in making the recesses in the index plates by machining, and the practically unachievable rigid fixing of the balls in the locking plates.

An object of the present invention is to provide a dividing attachment, for obtaining a high accuracy of angular indexing.

Another object of the present invention is to provide a method of producing the dividing attachment, which involves minimum expenses in the manufacture of the attachment.

SUMMARY OF THE INVENTION

According to the invention, these objects are achieved in that the spherical recesses of on the index plate are formed by compacting the material of the plate, and the distance between two adjacent recess being equal or multiple, to two radii of their sphere, while the balls are pressed into the locking plate to a depth exceeding the radius of the balls, with the balls being embraced by the material of the plate entirely over the surface of their embedment into the plate.

Other objects and advantages of the invention will be clear from the following detailed description of exemplary embodiments thereof and the appended drawings, wherein:

BRIEF DESCRIPTIONS OF THE DRAWINGS

FIG. 1 is a view partly in elevation and partly in section of the dividing attachment for angular indexing according to the invention;

FIG. 2 -(top view, of the attachment shown in FIG. 1, the view being partly broken away);

DETAILED DESCRIPTION OF THE DRAWINGS

Figure 1:
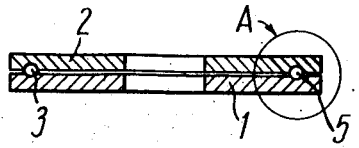
Figure 2:
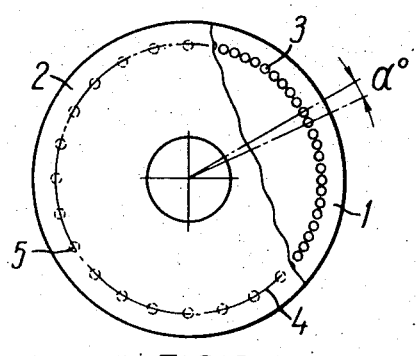

The present dividing attachment for angular indexing comprises two coaxial flat plates namely an index plate 1 (FIG. 1), and a locking plate 2. On the plane side of the index plate 1 there are provided spherical indentations or recesses 3, which are disposed along one circumference 4 (FIG. 2) and are equally spaced apart. The distance between two adjacent indentations 3 is equal or multiple, to two radii of their sphere.

On the side of the locking plate 2 which faces the plate 1, are rigidly fixed balls 5 having the same radius as the spherical indentations 3. The balls 5 are disposed on the plate 2 along a circumference of the same radius as the circumference 4, along which the indentations 3 are located on the index plate 1. The part of the surface of the balls 5 which projects from the plate 2, enters the corresponding indentations 3 of the index plate 1, and contacts all of the surface of the indentations 3, thus providing a high rigidity of the index plate 1 relative to the locking plate 2.

The indentations 3 are formed in the plane surface of the index plate 1 by compacting the material of the plate 1 to a depth which is somewhat less than the radius of the sphere of the indentations 3.

The balls 5 are pressed into the plane surface of the locking plate 2 to a depth which exceeds the spherical radius of the balls 5 by as much as the depth of the indentations 3 in the index plate 1 is less than the radius of their sphere, with the material of the plate 2 embracing the balls 5 entirely over the surface of their embedment in the plate 2.

Such a design of the dividing attachment provides for a high accuracy of angular indexing.

Angular indexing is realized by retracting one of plates 1 and 2 from the other, turning such plate to a required angle being equal or multiple, to the angular pitch (i.e. the angle α between two adjacent indentations 3) of the index plate 1, and then pressing (fixing) this plate against the first plate with the balls 5 contacting the bottom of indentations 3.

The diametrical dimensions of the dividing attachments with interval indexing are in direct relationship to the number of fixed positions of one plate relative to the other plate.

The employment of the invention permits significantly reducing the dimensions of the dividing attachments while maintaining a maximum possible number of angular divisions.

Figure 3:
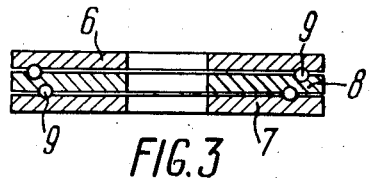
FIG. 3 is a view similar to FIG. 1 of a dividing attachment with two index plates and one double-sided locking plate.

Using the principle of differential indexing, there can be devised multistep dividing attachments comprising several index or locking plates having different pitches and made according to the invention. An example there of is one of such dividing attachments provided with three coaxial plates. It comprises two index plates 6 (FIG. 3) and 7, and one common locking plate 8 interposed between the plates 6 and 7 and carrying at each of its sides, a row of balls 9 entering the indentations provided in the mating plates 6 and 7.

The spacing pitch of the indentations on one index plate 6 is not multiple to the pitch of indentations on the other index plate 7, while the rows of balls 9 on the plate 8 are spaced in accordance with the indentations on the mating plates 6 and 7.

It is required, for instance, that this dividing attachment provide for an angular indexing through every 0°30'. For this purpose, the spherical indentations on the index plate 6 are spaced with an angular pitch of, say, 4°, and on the index plate 7 with an angular pitch of 4°30'. Then, assuming the lower index plate 7 to be the base (immovable) plate, the upper index plate 6 should be, together with the locking plate, 8 (i.e. as a single body) turned, say, clockwise relative to the plate 7, one pitch thereof (4°30'). Next, after the plate 8 is fixed against the plate 7, the plate 6 should be turned counter-clockwise with respect to the immovable plates 8 and 7, to its one pitch equaling −4°. The total angle of turn of the plate 6 relative to the plate 7 will be $$4°30' - 4° = 0°30'.$$

Thus, with the help of the plates 6, 7, and 8 angular indexing can be effected to any angle multiple to 0°30'.

Figure 4:
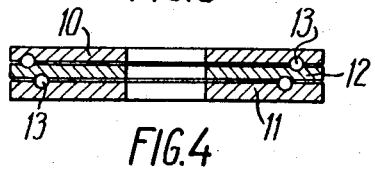
FIG. 4 is a view similar to FIG. 1 of a dividing attachment with two locking plates and one double-sided index plate.

Another dividing attachment with three plates comprises two locking plates 10 (FIG. 4) and 11, and a common index plate 12 interposed between the plates 10 and 11 and having at each side thereof a row of indentations spaced in accordance with balls 13 in the mating locking plates 10 and 11. The spacing pitches of the balls 13 on the locking plates 10 and 11 are not multiple to one another.

Using three and more plates in the dividing attachment, whatever fine angular divisions desired can be obtained with comparatively small overall dimensions of the dividing attachment.

The accuracy of indexing by the present dividing attachments totally depends on the precision of the angular disposition of the indentations in the index plates, and of the balls in the locking plates.

The precision of making the dividing attachment is provided by the proposed method of its production, in which the index and the locking plates are made in a single ball stamp by pressing out spherical indentations in the index plates with the aid of balls, and pressing similar balls into the surface of the locking plates to a depth exceeding the ball radius.

Figure 5:
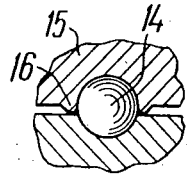
FIG. 5 is a view partly in elevation and partly in section of the circled area A in FIG. 1 at the moment of pressing the ball into the locking plate, the view being on an enlarged scale.
Figure 6:
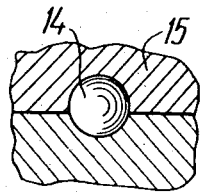
FIG. 6 is a view similar to FIG. 5 showing the ball after being embedded in the locking plate.

Spherical indentations in the index plate are formed as a result of local plastic deformation, i.e. compaction of the plate material in the places of its contact with the balls. The depth of the indentations is chosen somewhat less than the radius of their sphere. After the balls 14 (FIG. 5) are pressed into the plane surface of the locking plate 15 to a depth exceeding their radius, local plastic deformation of the metal of plate 15 results in annular convex surfaces 16 being formed around the balls 14, which convex surfaces are then deformed to embed the balls 14 in the plate 15, as shown in FIG. 6.

After embedment, the balls 14 are firmly held in the plate 15. The dividing attachments made by the above-described method feature an indexing accuracy approximating that of the optical dividing instruments, and due to the simplicity of the process of their production and its low cost, they can find wide application in industry.

I claim:

1. A dividing attachment for angular indexing, comprising at least two coaxial metal plates having plane sides, the first of said plates having on its plane side spherical indentations uniformly disposed along one circumference and formed by compacting the material of said first plate to a depth somewhat less than the radius of the sphere of the indentations, the distance between two adjacent indentations being equal or multiple, to two radii of their sphere, while the second of said plates is provided on its plane side facing said first plate with balls pressed into said second plate to a depth exceeding the radius of the balls by as much as the depth of the indentations in the first plate is less than the radius of their sphere, with the balls being embraced by the material of the second plate entirely over the surface thereof embedded in said second plate thereby rigidly fixing the balls in the second plate and said balls entering the indentations of the first plate and contacting all of the surface of the indentations.

2. The dividing attachment as claimed in claim 1 in which said first plate is an index plate and said second plate is a fixing plate.

* * * * *